United States Patent [19]

Fujita et al.

[11] 4,418,483

[45] Dec. 6, 1983

[54] METHOD OF MANUFACTURING SHOE SOLE MATERIAL AND SHOES PRODUCTS MADE BY THE SAME

[75] Inventors: Minoru Fujita, 8-banchi, 2 chome, Kouryo-cho, Kita-ku, Kobe-shi, Hyogo-ken, Japan; Shigeo Nishida, Hyogo, Japan

[73] Assignee: Rinzai Co., Ltd., Hyogo, Japan; by said Shigeo Nishida

[21] Appl. No.: 249,451

[22] Filed: Mar. 31, 1981

[51] Int. Cl.³ .............. B29D 27/00; A43B 13/18; A43B 13/12; B32B 5/20

[52] U.S. Cl. .............. 36/28; 36/30 R; 264/45.1; 264/241; 264/DIG. 18; 428/314.4; 428/316.6

[58] Field of Search ........ 264/45.5, 54, 45.1, 264/46.6, 257, 236, 241, DIG. 18; 36/28, 25 R, 30 R, 32 R

[56] References Cited

U.S. PATENT DOCUMENTS

| | | | |
|---|---|---|---|
| 1,813,235 | 7/1931 | Dunbar | 264/236 |
| 2,199,006 | 4/1940 | Minor | 264/54 X |
| 2,247,337 | 6/1941 | Raflovich | 264/46.6 X |
| 2,650,390 | 9/1953 | Capdevila | 264/54 X |
| 2,822,627 | 2/1958 | Seiberling | 264/54 X |
| 2,979,775 | 4/1961 | White | 264/54 |
| 3,047,888 | 8/1962 | Shecter et al. | 428/316.6 X |
| 3,137,749 | 6/1964 | Bingham | 264/257 X |
| 3,357,137 | 12/1967 | Lombardi et al. | 264/45.5 X |
| 3,423,490 | 1/1969 | Trogdon et al. | 264/45.1 |
| 3,596,381 | 8/1971 | Fukvoka | 264/45.5 X |
| 3,766,669 | 10/1973 | Pearsall | 36/28 X |
| 3,818,085 | 6/1974 | Marsland et al. | 264/45.5 |
| 3,944,704 | 3/1976 | Dirks | 428/316.6 X |
| 4,128,950 | 12/1978 | Bowerman et al. | 36/30 R |
| 4,167,824 | 9/1979 | Wolpa | 428/316.6 X |
| 4,187,621 | 2/1980 | Cohen | 428/316.6 X |

Primary Examiner—Philip E. Anderson
Attorney, Agent, or Firm—Wenderoth, Lind & Ponack

[57] ABSTRACT

A method of manufacturing shoe sole material which is lightweight in addition to having such properties as the conventional rubber sole materials have like wear resistance and elasticity etc., in a simple manner by forming the outsole and midsole layers into one piece by fusion using a mold. The mold comprises mold pieces having on their surface optional pattern and protruding stripes of the same or different pattern carved at equal intervals, and permits a streamline-shaped heel-up on the rear end of the portions which are to become heels, at the same time as forming the midsole and outsole layers into one piece by fusion.

13 Claims, 6 Drawing Figures

U.S. Patent Dec. 6, 1983 Sheet 1 of 2 4,418,483
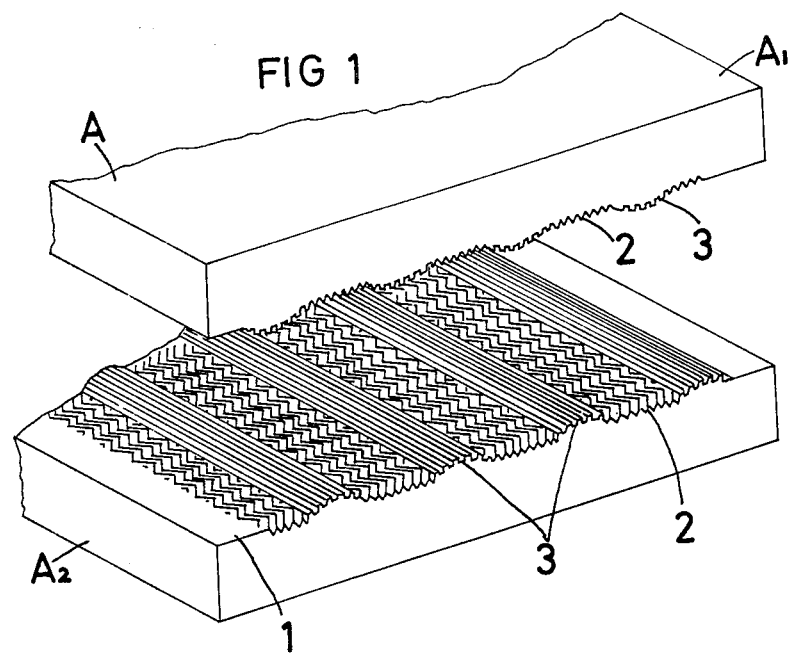
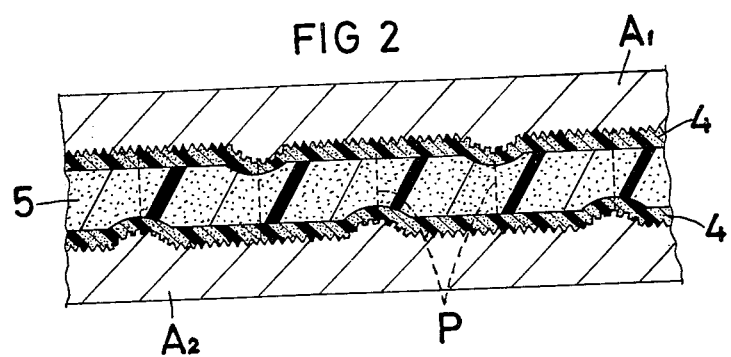
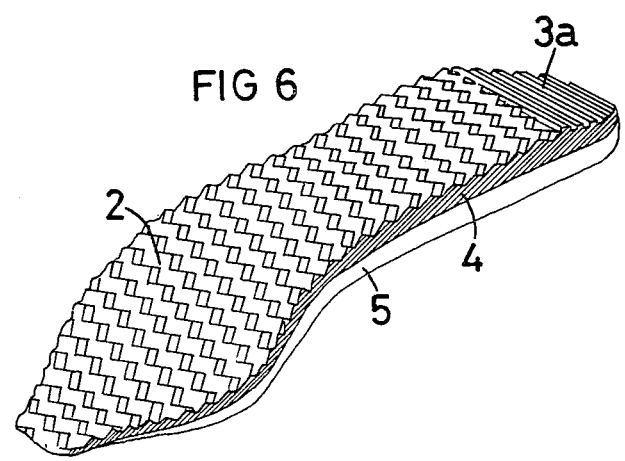

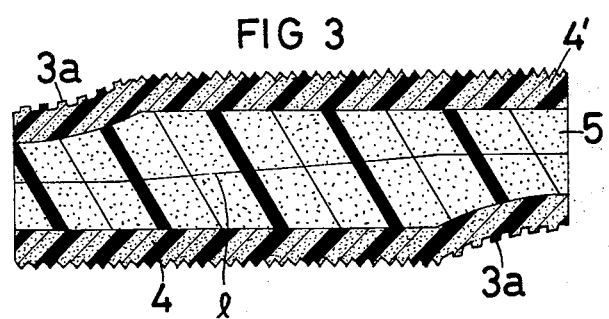
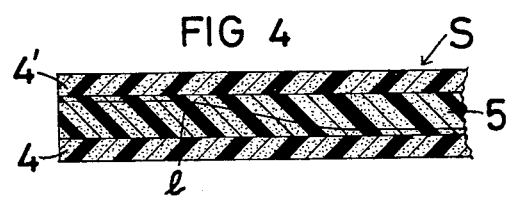
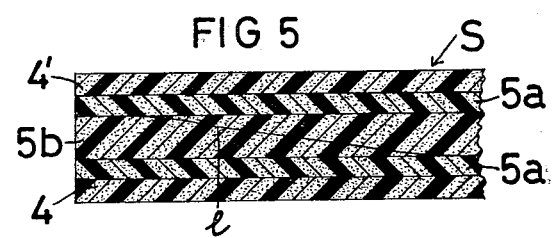

METHOD OF MANUFACTURING SHOE SOLE MATERIAL AND SHOES PRODUCTS MADE BY THE SAME

This invention relates to a method of manufacturing shoe sale material and to the shoe products produced by using the same.

More particularly, the invention relates to a method wherein a midsole layer and outsole layer(s) of synthetic resin (including synthetic rubber) sheets are superposed and put between mold pieces having an optional pattern carved on the inside surface(s) or, further, protruding stripes of the same or different pattern carved at equal intervals thereon, and hot pressed into one piece by fusion. It is also possible according to the invention to heel up the rear end of the portion which is to form the heel into a streamline shape.

So far, rubber materials have been widely used as shoe sole material because of their wear resistance and elasticity. They have, however, such drawbacks as requiring complicated molding process and polluting the environment.

Recently, requirements for light weight of the sole material for foot-wear, in addition to the same characteristics as the rubber has, have arisen. To meet such requirements, the sole material is manufactured by expansion molding using mostly ethylene-vinyl acetate copoylmer (hereinafter abbreviated as EVA).

In addition, there have been proposed a press-crosslinking foam process and injection molding foam process for EVA.

However, the sole material (outsole material) made by any of these processes requires an additional process of cementing it to the midsole material, like rubber material, and this has been done mainly with adhesives.

Some sneakers, tennis shoes, etc. have the rear end of the heel heeled up in a streamline shape to soften the shock when the foot hits the ground and thus mitigate the fatigue of the feet. In such cases, an additional operation of shaving off the rear end of the midsole material is required when combining the outsole material with the midsole material.

Thus, even if lightweight synthetic resin sole material has become available in place of rubber sole material by the use of EVA, etc., the problems of time and labor in cementing the outsole with the cushioning midsole, unevenness of applying the adhesive, and polluting the environment (e.g. hazard of fire and influence of solvent on the human body) have not been solved, and hand work such as buff finishing have not been improved.

It is an object of the present invention to provide a method of manufacturing shoe sole material wherein the midsole layer and the outside layer comprises the same or similar types of synthetic resin or rubber, and are formed into a united body in a mold.

It is another object of the invention to provide a method of manufacturing shoe sole material wherein the streamline shape (heel up) on the rear end of the heel is formed at the same time as the formation of the shoe sole material by using a mold that is capable of forming the rear end of the heel in such a streamline shape.

It is still another object of the invention to provide a method of manufacturing shoe sole material wherein the operation of sticking the outside layer to the midsole layer using an adhesive is eliminated.

These and other objects of the invention will be apparent from the following description, taken in connection with the accompanying drawings illustrating one embodiment, in which:

FIG. 1 is a partial perspective view of an example of a mold used in the process of the invention;

FIG. 2 is a cross-sectional view of the outsole and midsole layers fused into a single piece by using the mold shown in FIG. 1;

FIG. 3 is a cross-sectional view of the united piece taken out of the mold and cut at the centers and in the lengthwise direction of the stripes;

FIG. 4 is a cross-sectional view of the outsole layer and midsole layer fused into a piece (without heel-up on the heel);

FIG. 5 is a cross-sectional view of the united outsole and midsole layers as shown in FIG. 4 in which the midsole layer comprises two layers of different hardness; and FIG. 6 is a perspective view showing an example of a shoe sole made by cutting the shoe sole material obtained according to the method of the invention into a specified shape.

Referring now to FIG. 1, a mold A comprising an upper mold piece $A_1$ and lower mold piece $A_2$ is carved on the inside surfaces of the mold pieces $A_1$ and $A_2$ with a wavy pattern 2 and with parallel protruding stripes 3 having an arc-shaped convex-and-concave cross-section and arranged at certain intervals.

On the lower mold piece $A_2$ is placed a frame (not shown) for adjusting the thickness of the shoe sole material to be manufactured, and therein are placed, in turn, a sheet of synthetic resin for outsole layer 4, a sheet of synthetic resin for midsole layer 5, and, further, that for outsole layer 4, and thereon is placed the upper mold piece $A_1$. When these layers are hot-pressed under adequate conditions to form crosslinkages in the synthetic resin (vulcanization), the patterns carved on the surfaces of the upper and lower moldpieces are transferred on the surface of the outsole layers, and the layers are united by fusion into a piece of molding as shown by the cross-section in FIG. 2. The piece of united layers is taken out of the mold and cut at each position P, i.e. the center of each striped portion shown by the dotted lines in FIG. 2, along the length of each stripe.

FIG. 3 shows a cross-section of the cut out portion of the molding, in which portions 3a are the convex-and-concave half-arcs impressed by the protruding stripes 3 on the mold pieces $A_1$ and $A_2$. These portions 3a form the streamline shape, namely heel-up, on the rear end of the heel.

Since, in this embodiment, the midsole layer sandwiched between the outsole layers is molded between the upper and lower mold pieces $A_1$ and $A_2$ by hot pressing to form crosslinkages (vulcanization) in the synthetic resin, shoe soles as shown in FIG. 6 can be obtained when the molding shown in FIG. 3 is divided along the line 1 by a splitting machine and cut into the required shape.

While a preferred embodiment has been described in which three layers of outsole-midsole-outsole are put between the upper and lower mold pieces as shown in FIGS. 1 and 2, it is also possible to use only either one of such mold pieces, and in such a case a two-layer composition of outsole and midsole is vulcanized by a similar procedure.

While the protruding stripes for forming the streamline shape, that is, the heel-up on the rear end of the heel in this invention have been illustrated as having an arc-shaped cross-section, they are not limited to this configuration, but can have trapezoidal or obtuse triangular cross-sections.

In short, the protruding stripes can have any configuration that does not allow the resin constituting the sheet to flow out to the periphery too much when foaming and being pressed and melted by the protruding stripes. That is, the thickness of the outsole layer should not become extremly uneven.

The depth of the protruding stripes can be adequately selected for the same reasons.

As the main material constituting the sheets for the outside layer and midsole layer according to the invention, various synthetic resins (including synthetic rubbers) can be used, in which EVA and 1,2-polybutadiene resin are preferable. To improve the hardness, tensile strength, tear strength, compressive strain, and wear resistance of these resins, high styrene, SBR, IR, NBR, or natural rubber can be added as far as it does not interfere with forming the sheets into one piece by fusion.

An embodiment wherein the above mentioned EVA and/or 1,2-polybutadiene or synthetic rubbers are used as the main component of the midsole layer and outsole layer will be hereinafter described.

The midsole layer is required to have excellent cushioning properties, while the outsole layer should have all the characteristics required for a rubber sole. Therefore, should the main material be EVA and/or 1,2-polybutadiene or synthetic rubbers, they must be different in foaming degree and hardness.

The above EVA and/or 1,2-polybutadiene or synthetic rubbers should be blended, when used as the main component of the midsole layer in the invention, with a crosslinking agent and a foaming agent in such amounts that the foaming ratio falls within a range from 1.5 to 15, and the hardness after vulcanization, in a range from 30 to 80, and when used as the main component of the outsole layer, in such amounts that the hardness falls in a range of 45 to 98.

The outside layer need not be foamed if it has a hardness of 45 to 98 after being molded, but it will do no harm to make it foam, and for this, a foaming agent may be blended so that the foaming ratio falls within a range from 1.01 to 8.

The composition of ethylene and vinyl acetate in EVA when it is used as the main material is preferably 60 to 95% ethylene and 40 to 5% vinyl acetate by weight for the midsole layer and 50 to 85% ethylene and 50 to 15% vinyl acetate by weight for the outsole layer; a larger amount of vinyl acetate for the outsole layer than for the midsole layer gives more rubber-like properties.

As a filler, light calcium carbonate, magnesium carbonate, hydrated silica, talc, etc. can be blended for the purpose of reinforcement or extension.

As the organic foaming agent to be blended into the EVA and/or 1,2-polybutadiene or synthetic rubbers used in the method of the invention, mention may be made of the compounds that produce gas such as nigtrogen and carbon dioxide by decomposition when heated, exemplified by azodicarbonamide, dinitrosopentamethylenetetramine, azobistributyronitrile, and mixtures thereof. The adequate amount to be added is 1 to 30 parts by weight to 100 parts by weight of the main material, EVA and/or 1,2-polybutadiene or synthetic rubbers.

As the crosslinking agent used as an essential component together with the organic foaming agent, there are organic peroxides that produce free radicals by heat decomposition and thereby cause EVA and/or 1,2-polybutadiene or synthetic rubbers to form intermolecular crosslinkages, exemplified by dicumyl peroxide, 1,3-bistertiarybutylperoxyisopropylbenzene, and benzoyl peroxide. The adequate amount to be added is 0.3 to 1.1 parts by weight to 100 parts by weight of the main material such as EVA for the midsole layer, and 0.5 to 1.5 parts by weight for the outsole layer; preferably an equal or somewhat larger amount for the outsole layer than for the midsole layer. This is for the reason that, if unbalanced quantities of the crosslinking agent are used in the outsole and midsole layers, the foam produced in the mold by hot pressing will be difficult to form into a sheet, being destroyed by released pressure when the mold is opened.

In addition, lubricants, brighteners, or pigments may be blended as required. Different pigments are preferably used for the midsole layer and outsole layer to change the color tone between the layers, and if two or more midsole layers are provided, use of pigments different in color for each layer is also desirable.

According to the method of the present invention, as described above, a sheet, which is to be the midsole layer, comprising EVA and/or 1,2-polybutadiene or synthetic rubbers and other components, is superposed on its upper and lower surfaces with sheets, which are to be the outsole layers, comprising the same EVA and/or 1,2-polybutadiene or synthetic rubbers and other components but having a foaming ratio different from that of the sheet for the midsole layer. These superposed sheets are hot pressed between mold pieces having optional patterns carved thereon, and then taken out of the mold when the pressure is released to give a formed shoe sole material comprising midsole and outsole layers bonded by fusion.

One embodiment is shown below:

(1) A mixture of EVA and/or 1,2-polybutadiene or synthetic rubbers, organic foaming agent, vulcanizing agent, crosslinking agent, filler, etc. prepared for the midsole layer is kneaded to obtain a uniform dispersion by a mixing roll held at a certain temperature, and formed into sheets of 0.1 to 3.0 mm in thickness.

(2) A mixture of EVA and/or 1,2-polybutadiene or synthetic rubbers and other components prepared for the outsole layer is formed into sheets 0.1 to 3.0 mm thick by the same procedure as (1).

(3) The sheets for the outsole layers obtained in (2) are superposed on the upper and lower surfaces of the sheet for the midsole layer obtained in (1). They are then put in the preheated press mold and hot-pressed at a temperature from 130° to 170° C. under a pressure from 4.5 to 7 km/cm$^2$ for a curing time of 30 to 90 sec per millimeter of the liner thickness. Thus, a foam as shown in FIG. 4, that is, a shoe sole material S comprising a midsole layer 5 sandwiched between outsole layers 4, 4' is obtained wieh the mold is opened with released pressure.

The obtained shoe sole material S is divided along the line l in the midsole layer by a splitting machine so as to fit the insole of the shoe bottom and is tailored to give shoe soles as shown in FIG. 6.

It is desirable for the manufacturing process and performance of the product to form each of the midsole and outsole layers with a plurality of sheets piled into the specified thickness.

In FIG. 5, the midsole layer 5 of the shoe sole material S shown in FIG. 4 is composed of layers 5a and 5b having different hardnesses, layers 5a being inserted in the upper and lower sides of layer 5b. This is suitable where good cushioning properties are required depending upon the type of the shoes. When the midsole layer 5 is thus divided into 5a and 5b, the hardness of 5a is preferably 50 to 70 and that of 5b is preferably 30 to 50, the layer 5b which is to be the upper layer being softer than the layer 5a. Such material is also divided along the line l in the midsole layer 5b like in the case in FIG. 4.

According to the invention, (1) One-piece molding by fusing of the midsole and outsole layers is made possible by using sheets of the same or similar type main material for both the layers, (2) A mold having special configurations of pattern carved thereon is used, and (3) Thereby a shoe sole material having streamline-shaped heel-up on the rear end of the heel is molded. The present invention further provides shoe products having soles made by such method.

EXAMPLE (1) Preparation of Sheet Meterial for Midsole Layer

Compositions of EVA, 1,2-polybutadiene, SBR, HR, IR, NBR, SMR, organic foaming agent, crosslinking agent, and various additives shown in Table 1 were kneaded by a mixing roll held at 90° C. to obtain a uniform dispersion and formed into sheets of about 0.3 to 2.5 mm in thickness

TABLE 1

| Component | | 1 | 2 | 3 | 4 | 5 | 6 |
|---|---|---|---|---|---|---|---|
| EVA VE-634 | (1) | 83.3 | 83.3 | 83.3 | — | — | — |
| 1,2-polybutadiene RB-820 | (2) | — | — | — | 71.4 | 50.0 | — |
| Synthetic rubber SBR-1502 | (3) | 16.7 | 16.7 | 16.7 | — | — | 30.0 |
| Synthetic rubber IR-2200 | (4) | — | — | — | 28.6 | 20.0 | — |
| Synthetic rubber BR-01 | (5) | — | — | — | — | 30.0 | — |
| Synthetic rubber Tafdene-2003 | (6) | | | | | | 30.0 |
| Natural rubber SMR-5L | | — | — | — | — | — | 40.0 |
| Cumarone resin | | — | — | — | — | — | 3.0 |
| Organic foaming agent, Vinyfor AK-2 | (7) | 8.5 | 6.0 | 3.7 | 6.2 | 6.0 | — |
| Organic foaming agent, Celler GX | (8) | — | — | — | — | — | 7.25 |
| Crosslinking agent, Dicumyl peroxide | | 1.0 | 1.4 | 1.3 | — | 1.2 | — |
| Lubricant, Stearic acid | | 1.7 | 1.3 | 1.1 | 1.4 | 1.0 | 2.0 |
| Vulcanizing agent, Sulfur | | — | — | — | 1.1 | — | 2.2 |
| Filler, Titanium white | | 1.1 | 1.1 | 1.1 | — | — | — |
| Talc | | 16.7 | 14.0 | 14.0 | 21.4 | — | — |
| Hydrated Silica | | — | — | — | 19.0 | 10.0 | 30.0 |
| Active calcium carbonate, Carmos | (9) | — | — | — | — | 50.0 | — |
| Light calcium carbonate | | 8.3 | 14.0 | 14.0 | — | — | — |
| Active zinc white | | — | — | — | 9.3 | — | 5.0 |
| Hard clay | | — | — | — | 14.0 | 30.0 | 20.0 |
| Vulcanization accelerator, DM | | — | — | — | 1.8 | — | 1.2 |
| Vulcanization accelerator, TS | | — | — | — | — | — | 0.05 |
| Accelerator activator, Diethylene glycol | | — | — | — | 3.0 | — | — |
| Tackifier Quinton 203 | | — | — | — | — | — | — |
| Process resin | | — | — | — | — | — | 6.0 |
| Process oil | | — | — | — | — | — | 5.0 |
| Hardness | | 30 | 50 | 70 | 50 | 50 | 45 |

Note:
(1) VE-634: Ultrathene made by Toyosoda Co.
(2) RB-820: Nippon Synthetic Rubber Co.
(3) SBR-1520: Styrene-butadiene rubber made by Nippon Synthetic Rubber Co.
(4) IR-2200: Isoprene rubber made by Shell Petroleum Co.
(5) BR-01: 1,4-polybutadiene rubber made by Nippon Synthetic Rubber Co.
(6) Tafdene-2003: Styrene-butadiene rubber made by Asahi Chemical Industries Co.
(7) Vinyfor AK-2: "Azodicarbonamide" made by Eiwa Kasei Co.
(8) Celler GX: "Dinitrosopentamethylenetetramine" made by Eiwa Kasei Co.
(9) Carmos: Shiraishi Calcium Co.

The hardness mentioned in the above Table represents the hardness of foamed moldings according to each composition.

(2) Preparation of Sheet Material for Outsole Layer

Compositions shown in Table 2 were treated in the same manner as in (1) to give sheets for outsole layer having a thickness of about 1.5 mm.

TABLE 2

| Component | | 7 | 8 | 9 | 10 | 11 | 12 |
|---|---|---|---|---|---|---|---|
| EVA VE-634 | | 80.0 | 80.0 | — | — | 15.0 | — |
| 1,2-polybutadiene RB-820 | | — | — | 65.4 | 50.0 | 40.0 | — |
| Synthetic rubber SBR-1502 | | 10.0 | 10.0 | 21.5 | — | — | 25.0 |
| Synthetic rubber Hycar-2057SS | (1) | 10.0 | 10.0 | 13.1 | — | — | — |
| Synthetic rubber JSR-0061 | (2) | — | — | — | — | 45.0 | — |
| Synthetic rubber BR-01 | | — | — | — | 30.0 | — | — |
| Synthetic rubber IR-2200 | | — | — | — | 20.0 | — | — |
| Synthetic rubber Tafdene-2003 | | — | — | — | — | — | 35.0 |
| Natural rubber SNR-5L | | — | — | — | — | — | 35.0 |
| Cumarone Resin | | — | — | — | — | — | 3.0 |
| Organic foaming agent, Vinyfor AK-2 | | 2.6 | 2.0 | 4.5 | — | 4.5 | — |
| Organic foaming agent, Celler GX | | — | — | — | — | — | 4.0 |
| Crosslinking agent | | 0.9 | 0.9 | — | 1.1 | — | — |

TABLE 2-continued

| Component | (Parts by weight) | | | | | |
|---|---|---|---|---|---|---|
| | 7 | 8 | 9 | 10 | 11 | 12 |
| Dicumyl peroxide Crosslinking agent | — | — | — | — | 1.1 | — |
| Benzoyl peroxide Lubricant, Stearic acid | 1.0 | 1.0 | 1.5 | 1.0 | — | 2.0 |
| Vulcanizing agent, Sulfur | — | — | 1.5 | — | — | 2.2 |
| Filler, Titanium white | 1.6 | 1.6 | — | 2.5 | — | — |
| Talc | 26.2 | 13.3 | 8.5 | — | 25.0 | — |
| Hydrated Silica | — | 13.3 | — | 8.0 | 5.0 | 30.0 |
| Active calcium carbonate, Carmos | — | — | — | — | — | 25.0 |
| Hard clay | — | — | — | 45.8 | — | — |
| Active zinc white | — | — | 10.9 | — | — | 5.0 |
| Magnesium carbonate | — | — | 26.1 | — | — | — |
| Vulcanization accelerator, DM | — | — | 1.8 | — | — | 1.2 |
| Vulcanization accelerator, TS | — | — | — | — | — | 0.05 |
| Accelerator activator, Diethylene glycol | — | — | 3.0 | — | — | 2.0 |
| Tackifier Quinton 203 | (3) | — | — | — | — | 2.0 |
| Process resin | — | — | — | — | — | 3.0 |
| Process oil | — | — | — | — | — | 4.0 |
| Hardness | 70 | 90 | 70 | 95 | 75 | 70 |

Note:
(1) Hycar-2057SS: High styrene rubber made by Nippon Zeon Co.
(2) JSR-0061: High Styrene rubber made by Nippon Synthetic Rubber Co.
(3) Quinton 203: Nippon Zeon Co.

On the hardness, it is the same as Table 1.

(3) Manufacture of Shoe Sole Material

The sheets for outsole layer prepared in process (2) were superposed on the upper and lower surfaces of the sheet for midsole layer prepared in process (1). These superposed sheets were then put between preheated mold pieces having specified patterns carved on the inside surfaces and hot-pressed at a temperature in the range from 150° to 170° C. under a pressure of 6 kg/cm² for a curing perod of 40 to 90 sec to 1 mm of the liner thickness.

When the mold was opened after cooling with reduced pressure, a foamed molding was obtained which was excellent as a shoe sole material, having the midsole and outsole layers completely bonded by fusion. The physical properties of this foamed sheet are shown in Table 3. It was then split through the midsole layer, giving two sheets of shoe sole material having the same configuration.

For the above hot pressing, an oil hydraulic press is preferably used. With a 1000-ton press having a 30-inch diagram, for example, an operation pressure of 150 kg/cm² is preferable.

TABLE 3

| | Sole material obtained from Run Nos. 2 and 7 | Sole material obtained from Run Nos. 4 and 9 |
|---|---|---|
| 100% modulus (kg/cm²) | 13 | 19 |
| 200% modulus | 20 | 32 |
| Tensile strength | 51 | 54 |
| Tear resistance (kgf/cm) | 25 | 17 |
| Specific gravity | 0.5 | 0.47 |
| Hardness Hs (C-type hardness tester) | 70 | 67 |
| Tensile and elongation ratio (%) | 350 | 352 |
| Foaming ratio (Volume) | 2 | 2 |
| Cell structure | Closed-Cell | Closed-cell |

As shown above, the shoe sole material according to the invention has performances equal to the existing rubber sole materials, and can be molded into one piece together with the midsole layer, enhancing its value for practical use.

What is claimed is:

1. A method of manufacturing shoe sole material, which comprises:
   superposing a first sheet for a midsole layer on a second sheet for an outsole layer in a mold having a pattern formed on at least the mold surface in contact with said second sheet, said first sheet comprising a synthetic resin, a crosslinking agent and a foaming agent, said second sheet comprising a synthetic resin, a crosslinking agent and a foaming agent, said first and second sheets having different foamability ratios and being capable of being fused together under heat; and
   hot-pressing said superposed first and second sheets in said mold to foam at least said first sheet and form crosslinkages in and between said first and second sheets to fuse said first and second sheets together.

2. A method according to claim 1, wherein said mold has patterns formed on the mold surfaces in contact with both said first and second sheets.

3. A method according to claim 1, wherein said first sheet is composed mainly of 1,2-polybutadiene, an ethylene-vinyl acetate copolymer or a synthetic rubber, and has a foaming ratio from 1.5 to 15 and a hardness from 30 to 80 when formed into said midsole layer.

4. A method according to claim 1, wherein said midsole layer comprises two or more layers having different foaming ratios or different hardnesses.

5. A method according to claim 1, wherein said second sheet is composed mainly of 1,2-polybutadiene, an ethylene-vinyl acetate copolymer or a synthetic rubber, and has a hardness from 45 to 98 when formed into said outsole layer.

6. A shoe product containing the shoe sole material manufactured according to the method of claim 1.

7. A method of manufacturing shoe sole material, which comprises:
   superposing a first sheet for a midsole layer on a second sheet for an outsole layer in a mold having a pattern formed on at least the mold surface in contact with said second sheet, at least said mold surface in contact with said second sheet further having protruding stripes at equal intervals on said mold surface, said first sheet comprising a synthetic resin, a crosslinking agent and a foaming agent, said second sheet comprising a synthetic resin, a crosslinking agent and a foaming agent, said first and second sheets having different foamability ratios and being capable of being fused together under heat; and hot-pressing said superposed first and second sheets in said mold to foam at least said first sheet and form crosslinkages in and between said first and second sheets to fuse said first and second sheets together, and to form a streamline-shaped heel-up on the portion of said shoe sole material which is to become the heel of the shoe.

8. A method according to claim 7, wherein said mold has patterns and protruding stripes formed on the mold surfaces in contact with both said first and second sheets.

9. A method according to claim 7, wherein said protruding stripes are formed in parallel at certain intervals.

10. A method according to claim 7, wherein said first sheet is composed mainly of 1,2-polybutadiene, an ethylene-vinyl acetate copolymer or a synthetic rubber, and has a foaming ratio from 1.5 to 15 and a hardness from 30 to 80 when formed into said midsole layer.

11. A method according to claim 7, wherein said midsole layer comprises two or more layers having different foaming ratios or different hardnesses.

12. A method according to claim 7, wherein said second sheet is composed mainly of 1,2-polybutadiene, an ethylene-vinyl acetate copolymer or a synthetic rubber, and has a hardness from 45 to 98 when formed into said outsole layer.

13. A shoe product containing the shoe sole material manufactured according to the method of claim 7.

* * * * *